(12) United States Patent  
Ballu

(10) Patent No.: US 9,195,239 B2  
(45) Date of Patent: Nov. 24, 2015

(54) METHOD FOR CONTROLLING A SYSTEM FOR METERING AND MIXING A PRODUCT HAVING A PLURALITY OF COMPONENTS, METERING AND MIXING SYSTEM AND SPRAYING OR EXTRUSION FACILITY COMPRISING SAME

(75) Inventor: Patrick Ballu, Reims (FR)

(73) Assignee: EXEL INDUSTRIES, Epernay (FR)

( * ) Notice: Subject to any disclaimer, the term of this patent is extended or adjusted under 35 U.S.C. 154(b) by 604 days.

(21) Appl. No.: 13/574,393

(22) PCT Filed: Jan. 21, 2011

(86) PCT No.: PCT/FR2011/050117  
§ 371 (c)(1),  
(2), (4) Date: Sep. 19, 2012

(87) PCT Pub. No.: WO2011/089364  
PCT Pub. Date: Jul. 28, 2011

(65) Prior Publication Data  
US 2013/0003491 A1    Jan. 3, 2013

(30) Foreign Application Priority Data  
Jan. 22, 2010    (FR) ...................................... 10 50427

(51) Int. Cl.  
*B01F 15/04* (2006.01)  
*G05D 11/13* (2006.01)

(52) U.S. Cl.  
CPC .......... *G05D 11/133* (2013.01); *B01F 15/0412* (2013.01)

(58) Field of Classification Search  
CPC .................................................. B01F 15/0412  
USPC ................ 366/132, 134, 151.1, 152.1, 152.2, 366/160.5, 162.1, 162.3  
See application file for complete search history.

(56) References Cited

U.S. PATENT DOCUMENTS

| 4,176,672 | A |   | 12/1979 | Borberg |
| 4,440,314 | A |   | 4/1984 | Vetter et al. |
| 5,490,726 | A | * | 2/1996 | Davis et al. ................ 366/152.1 |
| 6,884,867 | B2 | * | 4/2005 | Pardikes ........................ 528/503 |
| 2009/0280034 | A1 | * | 11/2009 | Ballu ............................ 422/105 |

FOREIGN PATENT DOCUMENTS

| EP | 2101239 | 9/2009 |
| WO | 03045130 | 6/2003 |

OTHER PUBLICATIONS

International search report dated May 10, 2011 in corresponding PCT/FR2011/050117.

* cited by examiner

*Primary Examiner* — Charles Cooley  
*Assistant Examiner* — Marc C Howell  
(74) *Attorney, Agent, or Firm* — Young & Thompson

(57) ABSTRACT

A system includes a first pump feeding a first component into a mixer, and a second pump feeding a second component into the mixer. The movement of the piston of each pump can be reversed from a direction of suction and of expulsion of the volume of the pump to a direction of expulsion of the component and vice versa. A movement detector is associated with each pump and is connected to a controller programmed to trigger the reversal of a pump after having determined that the volume remaining in the pump is insufficient to ensure the predetermined metering ratio. The controller is programmed to provide the continuous feeding of the first component into the mixer through the operation of the system, and the intermittent feeding of the second component into the mixer in order to carry out cycles of feeding doses of the second component into the mixer.

16 Claims, 4 Drawing Sheets

METHOD FOR CONTROLLING A SYSTEM FOR METERING AND MIXING A PRODUCT HAVING A PLURALITY OF COMPONENTS, METERING AND MIXING SYSTEM AND SPRAYING OR EXTRUSION FACILITY COMPRISING SAME

BACKGROUND OF THE INVENTION

1. Field of the Invention

The present invention relates to a method for controlling a system for metering and mixing a product consisting of a first component and of a second component that have to be mixed in a mixer at a predetermined metering ratio.

Moreover, the present invention also relates to such a metering and mixing system in which the control method can be applied, and a spraying or extrusion device comprising such a metering and mixing system.

The role of this system is to deliver a mixture of at least two components in a ratio defined by an operator. This mixture is then used directly in the applications, for example for the spraying of a paint with the aid of a spraying device comprising a gun that is connected to this metering and mixing system.

In order to meter and mix a two-component product, it is known practice to use a system of this kind comprising a first double-acting, reciprocating, vertical pump capable of feeding the first component into the mixer, and a second double-acting, reciprocating, vertical pump capable of feeding the second component into the mixer, usually in sequence relative to the first pump. The movement of the piston of each pump can be reversed from a direction of expulsion of the component to a direction of suction and expulsion of the component and vice versa. The circuit of each pump comprises, in addition to a suction valve and a discharge valve associated with the pump, a feed valve inserted between the discharge valve of each pump and the mixer.

2. Description of the Related Art

A known control method comprises the following phases consisting in:
  opening the feed valve of the first pump and feeding a predefined dose into the mixer as a function of the said predetermined dose ratio;
  closing the feed valve of the first pump;
  opening the feed valve of the second pump and feeding a predefined dose into the mixer as a function of the said predetermined dose ratio;
  closing the feed valve of the second pump so as to terminate the phases of a first feed cycle;
  triggering the reversal of the piston of each pump in its suction and expulsion direction when it is necessary to again fill this pump with the corresponding component; and
  reopening the feed valve of the first pump in order to begin the next cycle by repeating these phases.

In this known system with sequential feeding, the reversal of the movement of the piston of the pump from the expulsion direction to the suction and expulsion direction of the pump and vice versa is triggered by an end-of-travel abutment of the piston of the pump.

U.S. Pat. No. 6,896,152 describes another sequential-feeding system. According to this document, a device for delivering a material with several components under pressure by using a spray gun comprises two position sensors of which each is associated with a respective drive/pump device assembly for delivering increments of resolution corresponding to a fixed volume fed by the pump into a mixer. A controller is connected to the position sensors in order to reciprocatingly move one of the drive/pump device assemblies by one increment. The other drive/pump device is then moved by an increment in order to adjust the predetermined metering ratio.

The drawback of these known systems is that they do not allow the pumps to be used optimally, in particular because this operation causes an interruption in the flow rate when there is a reversal of one of the pumps before being able to continue this sequential feeding.

In its patent application FR2928466, the applicant proposed a solution for alleviating the drawbacks of the known metering and mixing systems. According to this patent application, the reversal of the first pump is carried out at the same time as the second pump feeds a dose of its component, and vice versa. Consequently, the reversal of the first pump takes place concurrently.

Document U.S. Pat. No. 4,440,314 describes a method for controlling a system for metering and mixing a product consisting of at least two components designed to be mixed in a mixer, at a predetermined metering ratio, the system comprising a reciprocating pump for each of the components, the feeding of the first component being continuous and the feeding of the second component being continuous and proportional to that of the first component in order to maintain the metering ratio.

BRIEF SUMMARY OF THE INVENTION

The object of the invention is to propose, while retaining the advantages provided by FR2928466, a metering and mixing system that is simplified and less costly in that it comprises fewer parts while allowing an operating mode that provides an improvement in the evenness of the mixture of the components of the product obtained at the outlet of the mixer.

A first subject of the invention is a method for controlling a system for metering and mixing a product consisting of at least two components, namely a first component and a second component designed to be mixed in a mixer at a predetermined metering ratio, the system comprising at least two pumps, namely a first reciprocating pump capable of feeding the first component into the mixer, and a second reciprocating pump capable of feeding the second component into the said mixer, the movement of the piston of each pump being able to be reversed from a direction of suction and of expulsion of the corresponding component to a direction of expulsion of the component and vice versa, the method comprising the phases consisting in:
  actuating the first pump in order to feed the first component into the mixer;
  actuating the second pump in order to feed the second component into the mixer as a function of the said predetermined metering ratio;
  continuously determining the volume remaining in each pump, and
  triggering the reversal of the piston of one pump after having determined that the volume remaining in the pump in the current direction of expulsion or of suction and of expulsion is insufficient to ensure the said predetermined metering ratio, and in which
  the feeding of the first component into the mixer from the first pump is a continuous feeding provided throughout the operation of the metering and mixing system in order to feed the first component without interruption,
  the feeding of the second component into the mixer from the second pump is an intermittent feeding in order to carry out cycles of feeding doses of the second component so as to maintain the said predetermined metering ratio, and the second component is fed by the second pump with a higher pressure than the pressure at which the first component is fed by the first pump.

According to other features of the method according to the invention:

the flow rate of the first component is constantly computed in order to continuously regulate the said doses of the second component as a function of the quantity of the first component fed at each moment to the mixer;

the first component fed by the first pump is prevented from being discharged backwards when the second pump feeds the second component;

the reversal of the first and second pumps is triggered when the volume remaining in the current direction of discharge of the component of the corresponding pump is insufficient to ensure the said predetermined metering ratio;

the second component is fed substantially perpendicularly in the continuous flow of the first component in order to make the doses of the second component penetrate the latter;

the first component is fed into the mixer along the longitudinal axis of the latter, while the second component is fed into the mixer substantially perpendicularly to the longitudinal axis of the latter.

A second subject of the invention is a metering and mixing system controlled for the application of the method according to the invention, the system comprising a first reciprocating pump capable of feeding the first component into the said mixer, and a second reciprocating pump capable of feeding the second component into the said mixer, the movement of the piston of each pump being able to be reversed from a direction of suction and of expulsion of the volume of the pump to a direction of expulsion of the corresponding component and vice versa, a movement detector being associated with each pump in order to continuously detect the movement of the piston of the pump, this movement detector being connected to a controller programmed to trigger the reversal of the piston of a pump after having determined that the volume remaining in the pump in the current direction of expulsion or of suction and expulsion is insufficient to ensure the predetermined metering ratio, the said controller also being programmed to provide a continuous feeding of the first component into the mixer, from the first pump throughout the operation of the metering and mixing system so that the first component is fed without interruption, and in order to provide an intermittent feeding of the second component into the mixer from the second pump in order to carry out cycles of feeding doses of the second component into the mixer so as to maintain the said predetermined metering ratio, characterized by the fact that the pressure at which the second pump feeds the second component is a higher pressure than the pressure at which the first component is fed by the first pump.

According to other features of the system according to the invention:

a non-return valve is associated with the first pump in order to prevent the first component fed by the latter from being discharged backwards during the feeding of the second component by the second pump.

A further subject of the invention is a spraying or extrusion device comprising the metering and mixing system according to the invention that allows the application of the control method according to the invention.

BRIEF DESCRIPTION OF THE DRAWINGS

Other features and advantages of the invention will emerge from the following description of a non-limiting embodiment of the invention, with reference to the appended figures in which.

DETAILED DESCRIPTION OF THE PREFERRED EMBODIMENTS

Figure 1:
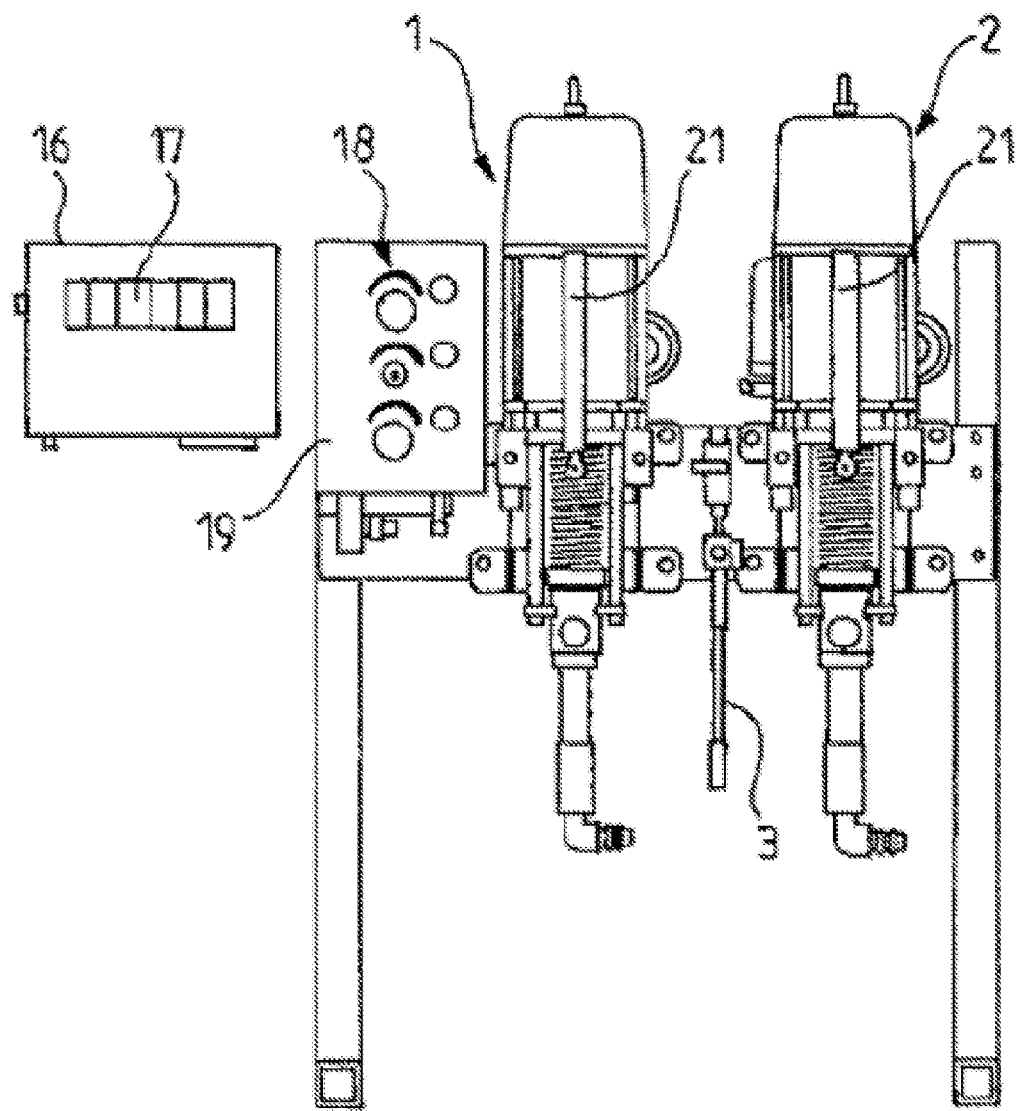
FIG. 1 is a front view of a metering and mixing system according to the invention.
Figure 2:
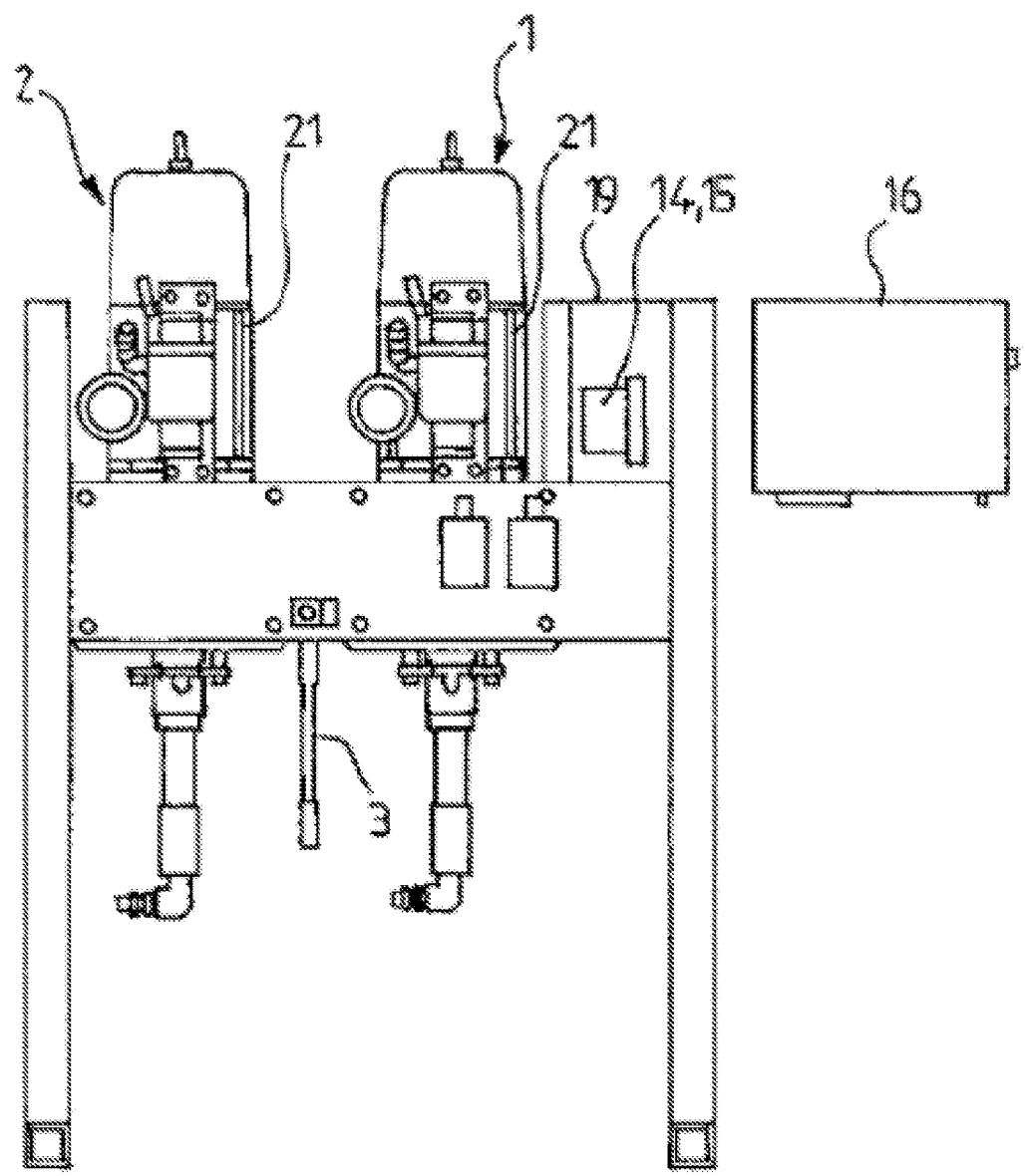
FIG. 2 is a rear view of the metering and mixing system of FIG. 1.

One embodiment of the invention will now be described with reference to the figures in which identical or equivalent elements will bear the same reference numbers.

The metering and mixing system illustrated in the figures is designed for the metering and mixing of a product such as a paint, with the aid of a spraying device comprising a spray gun (not shown). However, the product may be a pasty product and the metering and mixing system according to the invention is also well suited to being used in an extrusion device.

The product consists of at least two components including a first component 4 and a second component 5. The system comprises at least two pumps 1, 2 including a first, double-acting reciprocating pump 1 containing the first component, and a second, double-acting reciprocating pump 2 containing the second component. In the example illustrated, the pumps 1 and 2 are pneumatic pumps.

These first and second pumps are capable of feeding their respective component 4, 5 into a mixer 3 at the outlet of which the mixed product of the two components 4, 5, or more, is delivered, for example by a spray gun (not shown), or by an extrusion gun (not shown).

Each pump 1, 2 is connected to a tank of respective component 4', 5' (see FIG. 4) by means of a respective suction valve 6, 7. The piston (not shown) of each pump may be moved in a filling direction by sucking up the component (in an upward direction in the figures) in order to fill the volume of the pump when the corresponding suction valve 6, 7 is opened by placing the volume of the pump in communication with the respective tank 4', 5'. During the suction phase, the piston of each pump expels some component to the mixer 3 by means of a respective discharge valve 8, 9.

Then, the piston of the pump can be moved in the other direction which is a direction for expelling the component to the mixer 3 via a respective discharge valve 8, 9.

Figure 4:
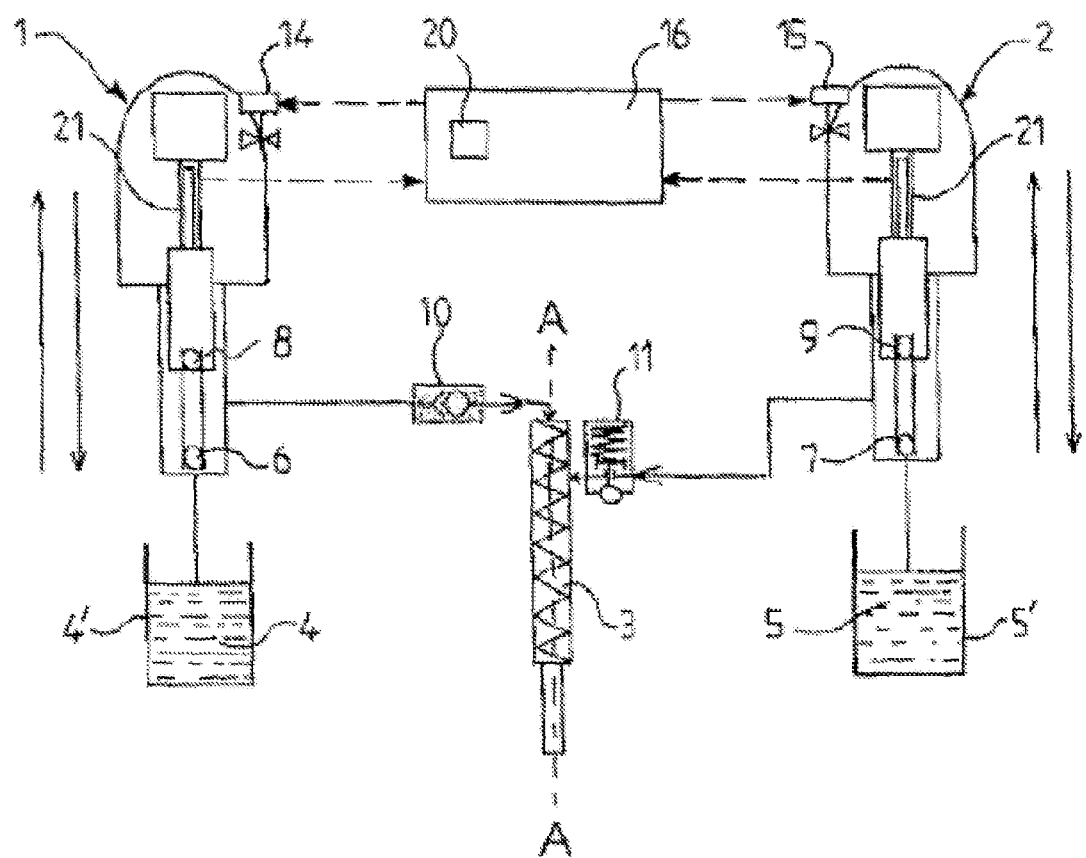
FIG. 4 is a schematic view illustrating the operation of the metering and mixing system according to the invention.

The reciprocating movement of the pistons of the pumps 1, 2 is indicated by arrows in FIG. 4.

The second pump 2 is connected to the mixer 3 via a feed valve 11 which can be switched between a fully closed position and a fully open position for an intermittent feeding in order to carry out feed cycles of doses of the second component 5, while, according to the invention, the first pump is deprived thereof for obtaining a continuous flow of the first component 4 fed without interruption.

Equally according to the invention, the pressure at which the second pump 2 feeds the second component 5 is higher than the pressure at which the first component 4 is fed by the first pump 1.

Also according to the invention, a non-return valve 10 is associated with the first pump 1 in order to prevent the first component 4 fed by the latter from being discharged backwards during the feeding of the second component 5 by the second pump 2.

Another advantage of this invention is the feeding of the second component 5 in an intermittent manner substantially perpendicularly directly into the continuous flow of the first component 4 so as to make the doses of the second component 5 penetrate the latter. This can be done with the aid of a simple T coupling placed upstream of the mixer 3 or indeed directly in the latter while feeding the first component 4 into it by means of a needle along the longitudinal axis (A-A) of the mixer, while the second component 5 is fed into the mixer substantially perpendicularly to the longitudinal axis of the latter, as illustrated in FIG. 4.

This gives a pre-mixing effect, either upstream of the mixer 3, or at the beginning of the mixer, which improves the evenness of the mixed product supplied at the outlet of the mixer.

Figure 3:
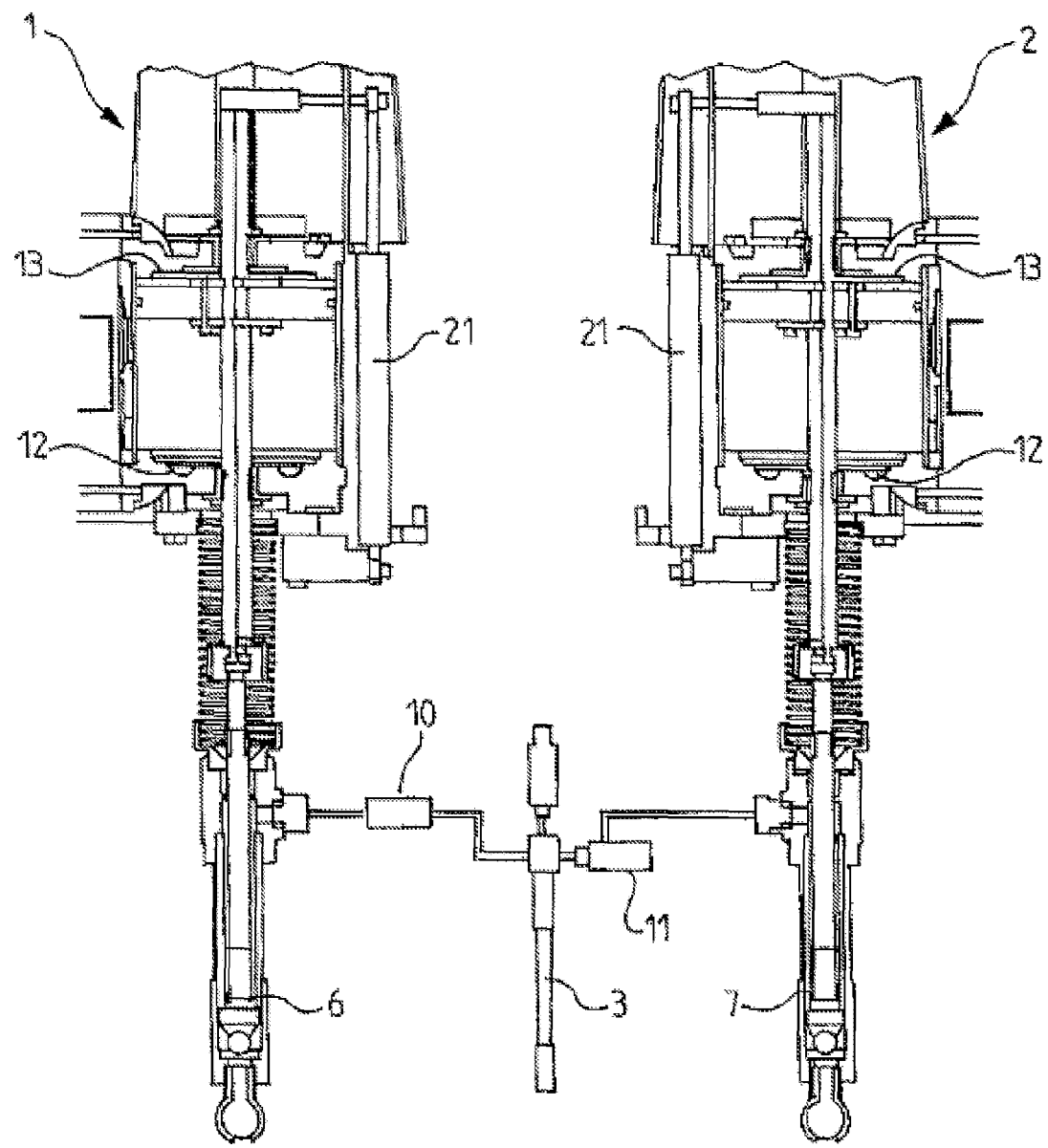
FIG. 3 is a partial view on a larger scale of the metering and mixing system according to the invention.

Each pump is also electronically or mechanically provided with a safety device in the form of a bottom abutment 12 and a top abutment 13 (see FIG. 3) defining the extreme positions of the piston in both directions.

These bottom and top abutments 12, 13 are defined by calibration; they are electronic position abutments read by sensors.

The reversal of the piston of each pump 1, 2 is triggered in one direction or the other by a respective solenoid valve 14, 15 (see FIG. 4).

The feed valve 11 and the reversal solenoid valves 14, are all connected to an electronic control box 16 which controls the opening and closing of the feed valve 11 and of the reversal solenoid valves 14, 15.

The control box 16 comprises a display screen 17 displaying the values that are input with the aid of a set of buttons (not shown) for adjustment and on/off associated with the control box 16.

Before beginning the use of the system, the following adjustments are made with the aid of the adjustment panel 19:

adjustment of the pressure by acting on two air regulators 18, one for each pump; this pressure must be maintained throughout the operation of the pumps.

Before beginning the use of the system, the following adjustments are made with the aid of the adjustment panel 16:

adjustment of the metering ratio of the first and second components 4, 5;

adjustment of the individual dose that has to be expelled from the pump 2 on each opening of the feed valve 11.

As an example, the pressure may be adjusted in a range from 0.1 to 100 bar, the metering ratio in a range from 1/1 to 100/1, and the dose of each pump in a range from 0.1 cc to 100 cc, the metering ratio being automatically maintained at the previously fixed value.

Moreover, the accuracy of the metering is for example of the order of +/−1%.

The electronic box 16 comprises a controller 20 programmed to trigger the reversal of the piston of a pump (1, 2) after having determined that the volume remaining in the pump (1, 2) in the current direction of expulsion or suction and expulsion is insufficient to maintain the predetermined metering ratio.

In order to determine at each moment the volume remaining in each pump 1, 2, the controller 20 is connected to a movement detector 21 associated with each pump in order to continuously detect the movement of the piston of the pump. Thus, the controller is capable of exactly computing the volume of component expelled as a function of the movement of the piston of each pump and thereby also the volume of the component remaining in the pump.

The movement detector 21 may be a linear detector.

Thus, the controller receives an output signal from the detector 21 and at each moment computes the volume remaining in the pump 1, 2 in order to determine whether or not the remaining volume is sufficient to maintain the predetermined metering ratio. When it becomes necessary, the controller 20 triggers the reversal of the piston of the pump by controlling the solenoid valves 14, 15 before reaching the bottom abutment 12 or top abutment 13.

The reversal of the pump 1 is thus carried out during the feeding of the other component from the pump 2 so as to prevent a drop in pressure and in flow rate during the operation of the system. Consequently, the reversal of the pump 1 takes place concurrently.

The reversal of the pump 2 is thus carried out while the valve 11 is closed and during the feeding of the other component from the pump 1 so as to prevent a drop in pressure and in flow rate during the operation of the system. Consequently, the reversal of the pump 2 takes place concurrently.

The detector 21 of the piston of each pump 1, 2 detects the movement and its output signal is fed to the controller 20 which can thus exactly compute the remaining volume at each moment in each pump immediately, on the one hand in order to trigger the reversal of the piston of each pump 1, 2 when that becomes necessary, and on the other hand in order to allow the controller 20 to constantly compute the flow rate of the first component 4 in order to continuously adjust the doses of the second component 5 fed from the second pump 2 as a function of the quantity of the first component fed at each moment to the mixer 3 and in order to ensure the necessary intermittent feeding of the second component 5 in order to maintain the predetermined metering ratio.

The method and the system are particularly well suited for mixing a first component consisting of a base with a second component consisting of a catalyst, but also for mixing pasty products.

The invention claimed is:

1. A method for controlling a system for metering and mixing a product consisting of two components, namely a first component (4) and a second component (5) designed to be mixed in a mixer (3) at a predetermined metering ratio, the system comprising two pumps, namely a first, double-acting, reciprocating pump (1) capable of feeding the first component (4) into the mixer (3), and a second, double-acting, reciprocating pump (2) capable of feeding the second component (5) into the said mixer (3), the movement of the piston of each of the first and second pumps (1, 2) being reversible, the method comprising the following steps:

actuating the first pump (1) in order to feed the first component into the mixer (3);

actuating the second pump (2) in order to feed the second component into the mixer (3) as a function of the said predetermined metering ratio;

continuously determining the volume remaining in each of the first and second pumps (1, 2), and triggering the reversal of the piston of the first pump or the second pump after having determined that the volume remaining in the first pump or the second pump in the current direction i) of expulsion or ii) of suction and of expulsion is insufficient to ensure the said predetermined metering ratio, wherein, the feeding of the first component (4) into the mixer (3) from the first pump (1) is a continuous feeding provided throughout the operation of the metering and mixing system in order to feed the first component without interruption, the feeding of the second component (5) into the mixer (3) from the second pump (2) is an intermittent feeding in order to carry out cycles of feeding doses of the second component so as to maintain the said predetermined metering ratio, and the second component (5) is fed by the second pump (2) with a higher pressure than the pressure at which the first component is fed by the first pump (1).

2. The control method according to claim 1, characterized by the fact that the flow rate of the first component (4) is constantly computed in order to continuously regulate the said doses of the second component (5) as a function of the quantity of the first component fed at each moment to the mixer (3).

3. The control method according to claim 1, wherein the first component fed by the first pump is prevented from being discharged backwards when the second pump (2) feeds the second component (5).

4. The control method according to claim 1, wherein the reversal of the first and second pumps (1, 2) is triggered when the volume remaining in the current direction of discharge of the component (4, 5) of the corresponding pump is insufficient to ensure the said predetermined metering ratio.

5. The control method according to claim 1, wherein the second component (5) is fed substantially perpendicularly in the continuous flow of the first component (4) in order to make the doses of the second component penetrate the latter.

6. The control method according to claim 5, wherein the first component (4) is fed into the mixer (3) along the longitudinal axis (A-A) of the latter, while the second component (5) is fed into the mixer substantially perpendicularly to the longitudinal axis of the latter.

7. The control method according to claim 2, wherein the first component fed by the first pump is prevented from being discharged backwards when the second pump (2) feeds the second component (5).

8. The control method according to claim 2, wherein the reversal of the first and second pumps (1, 2) is triggered when the volume remaining in the current direction of discharge of the component (4, 5) of the corresponding pump is insufficient to ensure the said predetermined metering ratio.

9. The control method according to claim 3, wherein the reversal of the first and second pumps (1, 2) is triggered when the volume remaining in the current direction of discharge of the component (4, 5) of the corresponding pump is insufficient to ensure the said predetermined metering ratio.

10. The control method according to claim 2, wherein the second component (5) is fed substantially perpendicularly in the continuous flow of the first component (4) in order to make the doses of the second component penetrate the latter.

11. The method of claim 1, wherein the first and second pumps are pneumatically-driven.

12. A controlled metering and mixing system comprising:
a mixer;
a first, double-acting, reciprocating pump (1) with a piston that feeds a first component (4) into the mixer (3),
a second, double-acting, reciprocating pump (2) with a piston that feeds a second component (5) into the said mixer (3),
movement of the piston of each of the first and second pumps being reversible;
a movement detector associated with each of the first and second pumps, the movement detector configured to continuously detect the movement of the pistons of the respective first and second pumps,
a controller connected to the movement detector, the controller configured to continuously determining the volume remaining in each of the first and second pumps and trigger reversal of the pistons of the first and second pumps after having determined that the respective volume remaining in the pumps in the current direction i) of expulsion or ii) of suction and expulsion is insufficient to ensure a predetermined metering ratio,
said controller also being programmed to provide a continuous feeding of the first component (4) into the mixer (3), from the first pump (1) throughout the operation of the metering and mixing system so that the first component is fed without interruption, and in order to provide an intermittent feeding of the second component (5) into the mixer (3) from the second pump (2) in order to carry out cycles of feeding doses of the second component into the mixer (3) so as to maintain the said predetermined metering ratio,
wherein the pressure at which the second pump (2) feeds the second component is a higher pressure than the pressure at which the first component is fed by the first pump (1),
actuation of the first pump (1) feeds the first component into the mixer (3),
actuating of the second pump (2) feeds the second component into the mixer (3) as a function of the said predetermined metering ratio, and
in use, the movement detector (21) associated with each of the first and second pumps continuously detects the movement of the pistons of the respective first and second pumps so that the controller that triggers the reversal of the pistons of the respective first and second pumps upon determining that the volume remaining in the respective pumps in the current direction i) of expulsion or ii) of suction and expulsion is insufficient to ensure the predetermined metering ratio.

13. The controlled metering and mixing system according to claim 12, wherein a non-return valve is associated with the first pump (1) in order to prevent the first component fed by the latter from being discharged backwards during the feeding of the second component by the second pump (2).

14. The controlled metering and mixing system according to claim 12, in combination with a spraying or extrusion device.

15. The system of claim 12, wherein the first and second pumps are pneumatically-driven.

16. A method for controlling metering and mixing of a first component (4) and a second component (5) at a predetermined metering ratio, using a first, pneumatically-driven, double-acting, reciprocating pump (1) that feeds the first component (4) into a mixer (3), and a second, pneumatically-driven, double-acting, reciprocating pump (2) that feeds the second component (5) into the said mixer (3), the movement of a piston of each of the first and second pumps being reversible, the method comprising the following steps:
actuating the first pump (1) to feed the first component into the mixer (3);
actuating the second pump (2) to feed the second component into the mixer (3) as a function of the said predetermined metering ratio;
using a movement detector (21) associated with each of the first and second pumps to continuously detect the movement of the pistons of the respective first and second pumps, the movement detector being connected to a controller that triggers the reversal of the pistons of the respective first and second pumps after having determined that the volume remaining in the respective pumps in the current direction i) of expulsion or ii) of suction and expulsion, is insufficient to ensure the predetermined metering ratio;

continuously determining the volume remaining in each of the first and second pumps (1, 2); and using the controller, triggering the reversal of the piston of one of the first pump and the second pump upon having determined that the volume remaining in the one of the first pump and the second pump in the current direction i) of expulsion or ii) of suction and expulsion is insufficient to ensure the said predetermined metering ratio, wherein, using the controller, the feeding of the first component (4) into the mixer (3) from the first pump (1) is a continuous feeding provided throughout the operation of the metering and mixing system in order to feed the first component without interruption, using the controller, the feeding of the second component (5) into the mixer (3) from the second pump (2) is an intermittent feeding in order to carry out cycles of feeding doses of the second component so as to maintain the said predetermined metering ratio, and the second component (5) is fed by the second pump (2) with a higher pressure than the pressure at which the first component is fed by the first pump (1).

\* \* \* \* \*